Feb. 2, 1971 M. FIRESTONE 3,559,313
SNOWPLOW FOR AUTOMOBILES, TRUCKS AND TRACTORS
Filed Nov. 18, 1968
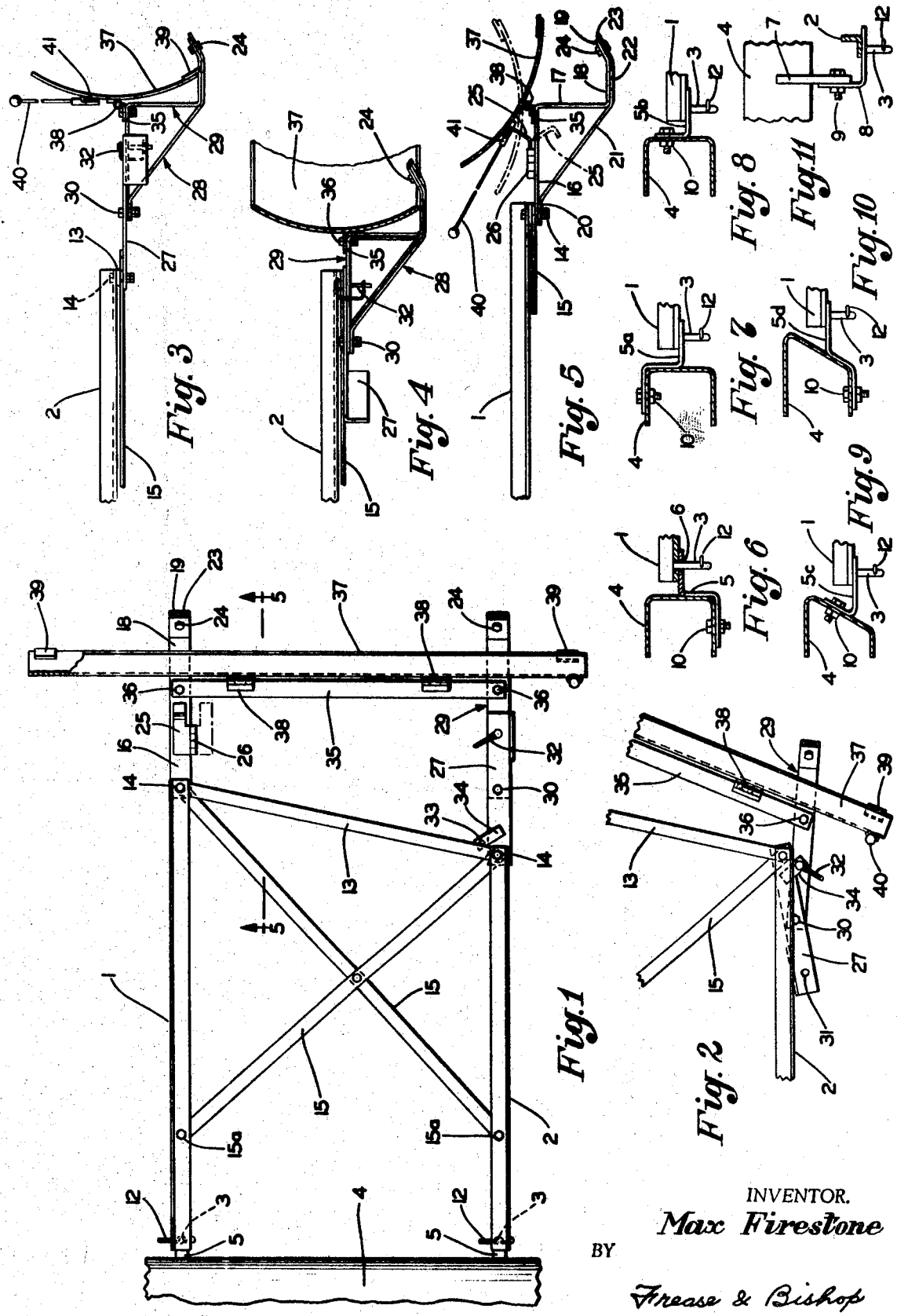

United States Patent Office 3,559,313
Patented Feb. 2, 1971

3,559,313
SNOWPLOW FOR AUTOMOBILES, TRUCKS AND TRACTORS
Max Firestone, % The Avalon Motel, 1733 E. High Ave., New Philadelphia, Ohio 44663
Filed Nov. 18, 1968, Ser. No. 776,630
Int. Cl. E01h 5/00
U.S. Cl. 37—42                                                  4 Claims

ABSTRACT OF THE DISCLOSURE

A snowplow for attachment to an automobile or other vehicle having a frame carrying runners at its forward end. A blade is hingedly mounted upon the runners which extend beneath and in front of the blade. One runner is directly attached to the frame and the other runner is connected to the frame by an adjusting lever for angling the blade.

There are rigid pins depending from the rear end of the frame and adapted to be inserted through apertures in brackets fixed upon a suitable portion of the vehicle such as the front bumper of an automobile. Means is provided for preventing accidental removal of the pins from the brackets.

BACKGROUND OF THE INVENTION

(1) Field of the invention

The invention relates to snowplows and more particularly to the type of snowplow adapted to be detachably connected to a motor driven vehicle.

(2) Description of the prior art

It is known that snowplows have been proposed for attachment to an automobile or other motor driven vehicle, but it is not known that any such implement has been disclosed which may be easily and readily attached to a vehicle by merely inserting two rigid pins upon the plow frame through apertures in brackets upon the front bumper of an automobile or the like.

Nor is it known that any snowplow for motor driven vehicles has been provided in which the blade is hingedly connected to the supporting frame so that it may tilt up and ride over deep snow when the vehicle is driven in reverse.

Furthermore, it is not known that any such snowplow is provided with a simple adjusting lever for quickly and easily adjusting the angular position of the blade.

SUMMARY OF THE INVENTION

In general terms, the invention may be briefly described as a snowplow for attachment to a motor-driven vehicle, and comprises a frame including two parallel side members, one of which is slightly longer than the other. A rigidly connected pin depends from the rear end of each side frame member and is adapted to be inserted through an aperture in a bracket attached to the front bumper of the vehicle.

Each of said rigidly connected pins has a transversely disposed aperture therethrough to receive a conventional snap pin for locking the frame to the bumper brackets.

A transversely disposed, angled cross brace is connected at its ends to the forward ends of the side frame members and two crossed frame members are connected each at its forward end to the forward end of one of the side frame members and at its rear end to the rear end portion of the other side frame member to stiffen and reinforce the frame.

A runner with an angular runner frame is directly connected to the forward end of the longer of the two side frame members, preferably by the same bolt that connects the cross brace and the crossed member thereto.

The frame of this runner has a hinged blade stopper thereon which may be swung upward upon its hinge to act as a stop for tilting movement of the blade when the plow is moved backward over deep snow.

An adjusting lever is pivotally connected at one end to the forward end of the shorter side frame member. Another runner with a similar angular frame is pivotally connected at its rear end to an intermediate portion of the adjusting lever.

Apertures at opposite ends of the adjusting lever are adapted to alternately register with an aperture in the intermediate portion of the last named runner frame, and a locking pin inserted through said apertures holds the lever, and with it the pivotally mounted runner and frame in either of the two adjusted positions.

A blade support member is connected at opposite ends to the two runner frames and the blade is hingedly connected to the blade support member, the lower edge of the blade resting on the lower portions of the runner frames, the runners and frames therefor extending forwardly of the blade.

With this construction the blade may be adjusted from a position substantially perpendicular to the path of movement of the plow to a position angling rearwardly and to the right; the blade may tilt up at its lower edge to pass backward over deep snow, the blade does not drag on the ground but is supported above the ground by the runners and their frames, so as to leave about a half inch of snow on the ground for traction and footage; and the plow may be quickly and easily attached to or removed from the vehicle without the use of bolts, nuts, screws or the like.

It is an object of the invention to provide a snowplow of the character referred to which has an easily operated adjusting lever for adjusting the angle of the blade.

Another object of the invention is to provide such a snowplow in which the blade will tilt when the plow is moved backward over deep snow.

A further object of the invention is to provide a snowplow of this type in which runners extend beneath and forward of the blade.

A still further object of this invention is to provide a snowplow of the character referred to in which the blade does not drag upon the ground.

Another object of the invention is to provide such a snowplow which may be easily and quickly hooked upon the bumper of an automobile or other vehicle.

The above objects together with others which will be apparent from the drawing and following description, or which may be later referred to, may be attained by constructing the improved snowplow in the manner hereinafter described in detail and illustrated in the accompanying drawing.

BRIEF DESCRIPTION OF THE DRAWING

FIG. 1 is a top plan view of a snowplow showing the bumper of an automobile to which it is attached, with the blade straight or parallel with the front bumper of the vehicle;

FIG. 2 is a fragmentary plan view with the blade in angled position;

FIG. 3 is a fragmentary side elevation of a snowplow with the adjusting lever extended as in FIG. 1;

FIG. 4 is a view similar to FIG. 2 with the adjusting lever pulled back, as in FIG. 2;

FIG. 5 is a fragmentary vertical section with the blade tilted up;

FIGS. 6 to 10 inclusive are sectional views of automobile bumpers showing various forms of brackets attached thereto and showing the manner of attaching one of the side frame members of the snowplow frame to one of the brackets; and FIG. 11 is a fragmentary front elevation of a portion of a bumper showing another type of bracket for attaching a frame member of the snowplow thereto.

DESCRIPTION OF THE PREFERRED EMBODIMENT

The improved snowplow to which the invention pertains comprises a blade supported upon a frame including two side frame members indicated at 1 and 2, the frame member 1 being of greater length than the member 2. These frame members may be in the shape of angle irons, or other suitable structural shape, and each has a rigidly connected pin 3 attached to its rear end.

In FIG. 1 the front bumper of an automobile is indicated at 4 and a pair of brackets for attaching the snowplow frame to the bumper is generally indicated at 5. These brackets may remain permanently on the front bumper in the same manner that a trailer hitch remains permanent upon the rear of a car for carrying a trailer.

In each of FIGS. 6 to 10 inclusive a portion of the front bumper of an automobile is indicated at 4 and various types of brackets are indicated at 5, 5a, 5b, 5c and 5d, respectively, in said figures. Each bracket has an aperture 6 therein through which is inserted the pin 3 rigidly connected to and depending from the rear end of each of said frame members 1 and 2.

In FIG. 11 is shown another form of bracket including a member 7 depending from the bumper 4, and the angular member 8 bolted to the member 7 as at 9. Each of the brackets 5 to 5c may be bolted to the bumper as indicated at 10 in FIGS. 6 to 10 inclusive. Each of the depending pins 3 has a transverse aperture therein through which a conventional snap pin 12 is inserted to prevent accidental detachment of the snowplow frame from the brackets.

As best seen in FIG. 1, the frame also includes a transversely disposed angled cross brace 13 connected at opposite ends to the forward ends of the side frame members 1 and 2 by bolts 14. A pair of crossed frame members 15 each has its forward end connected to the forward end of one of the side frame members 1 or 2 by the bolts 14, and its rear end connected to the rear end portion of the other side frame member as by bolts 15a.

A runner and its frame are connected to the forward end of the longer side frame member 1. The frame of the runner comprises the upper horizontal portion 16, the intermediate vertical portion 17, and the lower forwardly extending portion 18 terminating in the upturned angular end 19.

The corresponding runner includes the upper short horizontal portion 20, the downwardly and forwardly angled intermediate portion 21 and the forwardly extending lower horizontal portion 22 terminating in the upturned angular end 23.

The rear ends of the upper horizontal portions 16 of the frame and 20 of the runner are provided with apertures to receive the corresponding bolt 14. The upwardly angled terminal portions 19 and 23 of the frame and runner, respectively, are provided with corresponding apertures to receive a bolt 24.

Upon the top of the upper horizontal portion 16 of the runner frame is located a blade stopper 25 which is hingedly connected to the frame as indicated at 26.

An adjusting lever 27 is pivotally connected at its rear end to the shorter side frame member 2, by the corresponding bolt 14. A runner and runner frame, exactly like the one above described, and indicated generally at 28 and 29, respectively, are connected at their rear ends to an intermediate portion of the adjusting lever 27 by the bolt 30.

An aperture 31 is located in the forward end portion of the adjusting lever 27, and when the lever is extended as shown in FIG. 3, it registers with an aperture in the frame member 29 so that a locking pin 32 may be located through both apertures to hold the lever 27 in extended position.

When the lever 27 is pulled back to the position of FIG. 4 an aperture 33 in a projection 34 at the other end of the lever 27 will register with the above-mentioned aperture in the runner frame 29, and the locking pin 32 may be then located through these two apertures to hold the lever 27 in retracted position.

A blade support member 35 is connected at opposite ends to the frames of the two runners as by bolts 36. The blade 37, which is transversely curved, as shown in FIGS. 3 to 5 inclusive, is hingedly connected to the support member 35, as indicated at 38.

When it is necessary to move the plow backward, or in reverse, over deep snow, the blade 37 may tilt upward, as shown in FIG. 5, so as to pass over the snow. When the snowplow is in operation the blade stopper 25 is swung upward to the position shown in FIG. 5 to limit the tilting movement of the blade.

Furthermore, when the blade stopper 25 is turned down to the broken line position shown in FIG. 5, it will permit the blade 37 to lie down flat, as also indicated in broken lines in FIG. 5, so that the plow can be pushed forward to any point of operation without interference.

A clip 39 may be welded to each front corner of the blade 37 to prevent the corners of the blade from gouging on uneven surfaces. The lower edges of these clips are about ¼" above the surface of the ground.

Indicator sticks 40 are attached to the ends of the blade 37 as by pieces of iron pipe 41, welded to the back of the blade. These indicator sticks determine the edge of blade travel, and also indicate when the blade has tipped over snow traveling backward, as shown in FIG. 5.

From the above, it will be evident that a simple, easily operated efficient snowplow is provided for quick and easy attachment to or detachment from an automobile or other vehicle.

It will also be seen that the adjusting lever and locking pin provide a simple and efficient means for changing the angle of the blade and holding it in adjusted position.

It will also be seen that the blade will automatically tilt to pass backward over deep snow with means for stopping the tilting movement of the blade.

It is also obvious that the depending pins 3, rigidly connected to the rear ends of the side frame members 1 and 2, with the snap pins 12, provide means for easily hooking the plow onto the brackets on the bumpers or removing it therefrom without the use of bolts, nuts, screws or the like.

It is also seen in FIGS. 3 and 4 that the bottom edge of the blade does not drag upon the ground but rests upon the runners which extend under and forwardly of the blade, thus leaving about one-half inch of snow upon the ground for traction and footage.

I claim:

1. A snowplow for motor vehicles comprising a substantially horizontal frame including two side members one of which is longer than the other, a runner connected at its rear end directly to the forward end of the longer side frame member, an adjusting lever pivoted at one end to the forward end of the other side member, a runner pivotally connected at its rear end to an intermediate portion of the adjusting lever, means for connecting the rear end of the frame to the front of a vehicle, a blade hingedly connected to said runners so that it will tilt upward to pass over deep snow when the vehicle is driven in reverse, said runners extending beneath and forwardly of the blade so as to space the lower edge of the blade a predetermined distance above the ground, a frame for each runner including an upper horizontal portion, an intermediate vertical portion and a lower forward horizontal portion, there being apertures in opposite end portions of said adjusting lever adapted to selectively register with an aperture in the upper horizontal portion of the frame of said other runner, and a locking pin located through said registering aperture.

2. A snowplow as defined in claim 1 in which there are means attached to the front of the vehicle having apertures therein, and depending pins upon the rear of the frame adapted to be inserted into said apertures, each of said depending pins having a transversely disposed hole in its lower end portion and a snap pin located through said hole.

3. A snowplow as defined in claim 1 in which the blade is hinged to a blade supporting member connected at opposite ends to the upper horizontal portions of said runner frames.

4. A snowplow as defined in claim 3 in which there is a blade stopper hinged upon the upper horizontal portion of the frame of said one runner for limiting the tilting movement of the blade.

References Cited

UNITED STATES PATENTS

| | | | |
|---|---|---|---|
| 1,749,465 | 3/1930 | Caskin | 37—420L |
| 2,117,561 | 5/1938 | McMaster | 37—420L |
| 2,166,424 | 7/1939 | Coates | 37—420L |
| 2,191,323 | 2/1940 | Richter | 37—42 |
| 2,460,348 | 2/1949 | Henry | 37—50UX |
| 2,722,064 | 11/1955 | Jaffe et al. | 37—420L |
| 2,967,363 | 1/1961 | Meier | 37—53 |
| 3,218,738 | 11/1965 | Bowerman | 37—53 |

FOREIGN PATENTS

| | | | |
|---|---|---|---|
| 104,649 | 1942 | Sweden | 37—50 |
| 133,079 | 1960 | Russia | 37—42 |
| 606,485 | 1960 | Canada | 37—50 |
| 1,097,463 | 1961 | Germany | 37—42 |
| 1,254,966 | 1961 | France | 37—42 |

ROBERT E. PULFREY, Primary Examiner

E. H. EICKHOLT, Assistant Examiner

U.S. Cl. X.R.

37—50; 172—801